United States Patent
Siegl et al.

(10) Patent No.: US 8,283,826 B2
(45) Date of Patent: Oct. 9, 2012

(54) BEARING ARRANGEMENT AND BEARING BLOCK HAVING A MAGNETIC RADIAL BEARING AND A TOUCHDOWN BEARING FOR A ROTATING MACHINE

(75) Inventors: Günther Siegl, Berlin (DE); Hartmut Walter, Tokyo (JP)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 13/054,669

(22) PCT Filed: Jun. 10, 2009

(86) PCT No.: PCT/EP2009/057211
§ 371 (c)(1),
(2), (4) Date: May 23, 2011

(87) PCT Pub. No.: WO2010/006859
PCT Pub. Date: Jan. 21, 2010

(65) Prior Publication Data
US 2011/0210631 A1    Sep. 1, 2011

(30) Foreign Application Priority Data
Jul. 18, 2008 (DE) .......................... 10 2008 033 758

(51) Int. Cl.
*H02K 7/09* (2006.01)
(52) U.S. Cl. .......................... 310/90.5; 310/51; 310/90

(58) Field of Classification Search .................... 310/51, 310/90, 90.5
See application file for complete search history.

(56) References Cited

U.S. PATENT DOCUMENTS

| 4,346,949 A | 8/1982 | Beau |
| 5,021,697 A | 6/1991 | Kralick |
| 5,521,448 A | 5/1996 | Tecza et al. |
| 5,679,992 A | 10/1997 | Miyamoto et al. |
| 2005/0116552 A1* | 6/2005 | Safonov .......................... 310/51 |
| 2008/0095482 A1* | 4/2008 | Swann et al. .................. 384/192 |
| 2009/0091203 A1 | 4/2009 | Petereit et al. |

FOREIGN PATENT DOCUMENTS

| DE | 30 11 078 A1 | 9/1980 |
| DE | 43 34 662 A1 | 4/1994 |
| DE | 696 25 870 T2 | 12/2003 |
| DE | 10 2005 036 942 A1 | 2/2007 |
| DE | 10 2006 019 873 B3 | 10/2007 |
| EP | 0 768 467 B1 | 4/1997 |
| EP | 0 867 627 A2 | 9/1998 |
| JP | 03 065804 A | 3/1991 |
| JP | 06335199 A | 12/1994 |

* cited by examiner

*Primary Examiner* — Quyen Leung
*Assistant Examiner* — David Scheuermann
(74) *Attorney, Agent, or Firm* — Henry M. Feiereisen, LLC

(57) ABSTRACT

A bearing arrangement and a bearing block includes a magnetic radial bearing for the contact-less support of a rotor shaft of a rotating machine, and a touchdown bearing for catching the rotor shaft. Both bearings are connected to each other permanently and in an axially aligned manner, and are elastically suspended with regard to a bearing shield, a machine housing, or a foundation of the rotating machine.

12 Claims, 3 Drawing Sheets

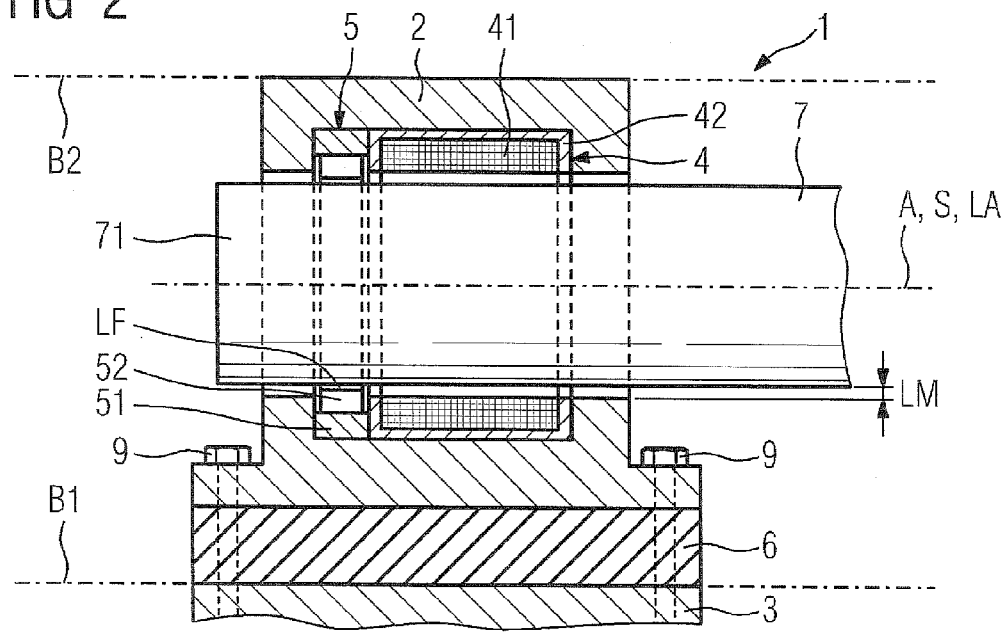
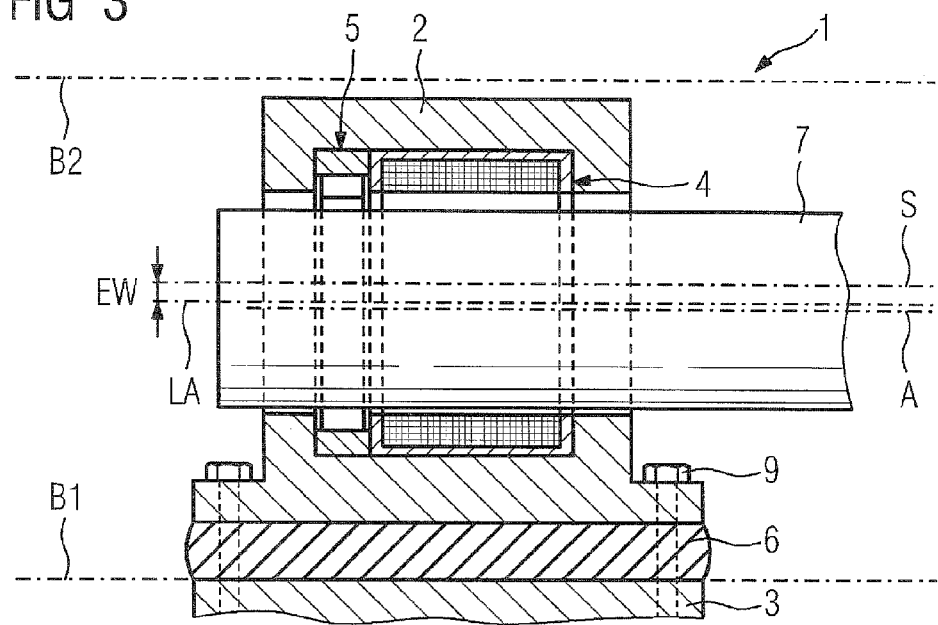

BEARING ARRANGEMENT AND BEARING BLOCK HAVING A MAGNETIC RADIAL BEARING AND A TOUCHDOWN BEARING FOR A ROTATING MACHINE

CROSS-REFERENCES TO RELATED APPLICATIONS

This application is the U.S. National Stage of International Application No. PCT/EP2009/057211, filed Jun. 10, 2009, which designated the United States and has been published as International Publication No. WO 2010/006859 and which claims the priority of German Patent Application, Serial No. 10 2008 033 758.7, filed Jul. 18, 2008, pursuant to 35 U.S.C. 119(a)-(d).

BACKGROUND OF THE INVENTION

The invention refers to two bearing arrangements including a magnetic radial bearing and a touchdown bearing for contactless support of a rotor shaft and for catching said rotor shaft of a turbomachine with a power output of 1000 kW and more, wherein both bearings, in axial alignment, are accommodated in a common bearing housing.

Furthermore, the invention refers to two bearing blocks for a turbomachine with a power output of 1000 kW and more, wherein the respective bearing block is arranged axially on the outside with regard to the turbomachine and has a magnetic radial bearing, accommodated in a common bearing housing, for contactless support of a rotor shaft, and a touchdown bearing for catching said rotor shaft of the turbomachine, and wherein the two bearings, in axial alignment, are accommodated in the bearing housing.

Such a previously described bearing block is known from Japanese laid-open specification JP 6335199 A.

A bearing block with a bearing having a practically zero longitudinal play is described in German laid-open specification DE 30 11 078 A. The bearing block there has a bearing with rolling constructional elements. At least one race of the bearing is fixedly connected to a magnetic device and this magnetic device is arranged so that it provides a relative spacing relationship in the axial direction of the bearing block for the races of the bearing in order to practically eliminate the longitudinal play of the bearing.

A turbomolecular pump for use in sealed vacuum systems is known from the translation of DE 696 25 870 12 of European patent EP 0 768 467 B1. The bearing unit which is disclosed there comprises a stator-side, passive, radial magnetic bearing with a multiplicity of permanent magnets. Further permanent magnets, which are arranged on a rotor of the turbomolecular pump, lie opposite these permanent magnets, wherein in the controlled state like magnetic poles face each other in each case. The bearing unit, moreover, comprises a safety bearing element (emergency safety bearing element) which is fixedly connected to the stator-side part of the magnetic bearing in order to prevent direct contact between the rotor and the stator. Furthermore, the stator-side part of the magnetic bearing is movably suspended in the stator and pretensioned in the axial direction by means of a cylindrical, elastic pretensioning means in order to be able to interact with an active magnetic thrust bearing of the bearing unit for axial position control of the rotor. Furthermore, as a result of the pretensioning means the resonant vibrations in the radial direction of the main shaft or of the rotor, which arise during run-up of the rotor, are absorbed.

In the case of the rotating machines, they are preferably turbomachines, such as turbogenerators, turbomotors or turbocompressors. The maximum operating speed of such machines customarily lies at more than 4000 min$^{-1}$. They typically have a power output of 1000 kW and more. In the case of a turbocompressor, an electric motor unit drives a turbine unit. The rotor shaft of the electric motor unit and the turbine shaft are preferably arranged in alignment. Both shafts can be interconnected via a coupling element.

In the case of the known machines, active magnetic radial bearings for supporting the rotor shaft are used to an increasing extent instead of plain bearings in order to reduce friction losses there. In this case, the load-bearing capacity is created by controlled electromagnets. In the case of control failure, the rotor shaft or one rotor-shaft end drops into a touchdown bearing which for a limited time provides the emergency running characteristics of the rotating machines. The magnetic radial bearing and the touchdown bearing can be arranged in a bearing bracket or in a casing of the rotating machine. Alternatively, the magnetic radial bearing and the touchdown bearing can be axially adjacently accommodated in a common bearing housing of a bearing block. Provision is typically made for two bearing blocks for supporting a respective axial shaft end of the rotating machine. In addition, a magnetic thrust bearing, for axial fixing of the supported rotor shaft, can be accommodated in the bearing housing.

The magnetic bearings ensure a contactless, wear-free and stable supporting of the rotor shaft at very high speeds. During operational use, an air gap in the range of approximately 0.5 to 1.0 mm is typically maintained between the radial magnetic bearing and the rotor shaft which is to be supported. Since for system-related reasons a magnetic bearing can fail, provision is made for a touchdown bearing which can support the rotor shaft in the case of failure of the magnetic bearing or in the case of shutting down of the electrical system in general. For this purpose, the touchdown bearing has a slightly larger inside diameter in comparison to the shaft diameter so that the rotor shaft does not make contact with the touchdown bearing when the magnetic support is operational. The air gap between the touchdown bearing and the rotor shaft is somewhat smaller in comparison to the operational air gap in the case of the magnetic radial bearing. The air gap lies typically within a range of 0.1 to 0.5 mm.

A magnetic radial bearing typically has a hollow-cylindrical, annular construction with an annular magnetic core, on the radial inner side of which current coils are introduced for forming electromagnets for the magnetic support. Such magnetic radial bearings as a rule are fixedly connected to a bearing housing or to the bearing bracket by means of a threaded connection. Alternatively, the magnetic radial bearing can be part of a bearing block which is fixedly connected to the bedplate of the rotating machine which is to be supported. All supporting components of the rotating machine, including the magnetic radial bearing, are customarily of a rigid construction.

If the rotor shaft of the rotating machine drops into the touchdown bearing in the case of failure of the magnetic radial bearing, then severe shock loads occur on the entire bearing. These can principally be avoided by means of elastic supporting of the touchdown bearing. However, the available deflection travel of the touchdown bearing is restricted by the air gap of the active part of the magnetic bearing. This must not be exceeded in the case of collapse of the rotor shaft into the touchdown bearing in order to avoid damage and failure of the magnetic radial bearing. The adjustment parameters are therefore severely limited for elastic supporting of the touchdown bearing.

The magnetic radial bearings are connected to the bedplate of the rotating machine or to the bearing bracket or to the machine casing of the rotating machine at least indirectly in a fixed manner, that is to say rigidly or inflexibly. As a result of a rigid connection, the magnetic bearing is particularly sensitive especially at very high speeds. The cause lies in the fact that the position sensors which are required for controlling the magnetic radial bearing are also excited by mechanical excitations from outside, such as by the machine casing or via the bedplate. Consequently, the position sensors detect relative movements between the fixed magnetic bearing and the machine axis, that is to say the (structural) rotational axis of the rotating machine. The relative movements are consequently caused not only as a result of movement of the rotor shaft but also as a result of sensor movement. In such a case, the magnetic bearing disadvantageously cannot be operated in high speed ranges.

SUMMARY OF THE INVENTION

It is therefore an object of the invention to disclose a bearing arrangement which is improved in comparison to the prior art, and also an improved bearing block for a rotating machine.

According to one aspect of the present invention, the object is achieved by a bearing arrangement including a magnetic radial bearing and a touchdown bearing for contactless support of a rotor shaft and for catching the rotor shaft of a turbomachine with an electric power output of 1000 kW and more, wherein both bearings, in axial alignment and fixedly interconnected, are accommodated in a common bearing housing, wherein the bearing housing is elastically suspended with regard to a bearing bracket or with regard to a machine casing.

According to another aspect of the present invention, the object is achieved by a bearing arrangement including a magnetic radial bearing and a touchdown bearing for contactless support of a rotor shaft and for catching the rotor shaft of a turbomachine with a power output of 1000 kW and more, wherein both bearings, in axial alignment, are accommodated in a common bearing housing, wherein both bearings are elastically suspended in the common bearing housing, and wherein the bearing housing is fixedly connected to the bearing bracket or to the machine casing.

According to yet another aspect of the present invention, the object is achieved by a bearing block for a turbomachine with a power output of 1000 kW and more, wherein the bearing block is arranged axially on the outside with regard to the turbomachine and has a magnetic radial bearing, accommodated in a common bearing housing, for contactless support of a rotor shaft, and a touchdown bearing for catching the rotor shaft of the turbomachine, wherein the two bearings are in axial alignment and fixedly interconnected, wherein the two bearings are elastically accommodated in the bearing housing, and wherein the bearing block has a support for fastening of the bearing housing on a machine casing or on a bedplate of the turbomachine.

According to still another aspect of the present invention, the object is achieved by a bearing block for a turbomachine with a power output of 1000 kW and more, wherein the bearing block is arranged axially on the outside with regard to the turbomachine and has a magnetic radial bearing, accommodated in a common bearing housing, for contactless support of a rotor shaft, and a touchdown bearing for catching the rotor shaft of the turbomachine, wherein the two bearings, in axial alignment and fixed, are accommodated in the bearing housing, wherein the bearing block has a support for fastening of the bearing housing on a machine casing or on a bedplate of the turbomachine (10), wherein at least one elastic element is arranged between the bearing housing and the bearing-block support and/or between the bearing-block support and the machine casing or between the bearing-block support and the bedplate.

According to the invention, the bearing housing of the bearing arrangement with the two fixedly interconnected bearings is elastically suspended with regard to a bearing bracket or with regard to a casing of the turbomachine. The two bearings are preferably fixedly screwed in the bearing housing.

With regard to the alternative bearing arrangement, according to the invention both bearings are elastically suspended in the common bearing housing. The bearing housing is fixedly connected to the bearing bracket or to the machine casing. The mechanical, fixed combination comprised of touchdown bearing and magnetic radial bearing, however, is accommodated in the bearing housing in an elastically movable manner to a certain degree. The mechanical assembly may be an axially extending tensioned assembly.

Consequently, shock loads on the touchdown bearing in the case of failure of the magnetic bearing are advantageously significantly reduced. A further advantage is that as a result of the elasticity of the touchdown bearing, brought about by the series-connection comprised of touchdown-bearing elasticity and the elasticity of the suspension, a considerably greater deflection travel is made available for the rotor shaft when it drops into the touchdown bearing. The deflection travel for the touchdown bearing is maintained relative to the magnetic-bearing air gap in this case. A further advantage is that as a result of this extended damping possibility the service life of the bearing arrangement and especially that of the touchdown bearing is significantly increased. Moreover, mechanical disturbances, which for example are coupled into the bearing arrangement or into the bearing block via the bedplate, are largely suppressed as a result of the elastic decoupling of the magnetic bearing. As a result, critical relative movements between the fixed magnetic bearing and the rotor shaft can no longer be measured by means of the position sensors.

For achieving the object for the bearing block, according to the invention the two fixedly interconnected bearings are elastically accommodated in the bearing housing. The bearing block has a support for fastening the bearing housing on a machine casing or on a bedplate of the turbomachine. In particular, the bearing-block support is fixedly connected to the machine casing or to the bedplate, that is to say inflexibly or rigidly connected.

Alternatively to the previous embodiment, at least one elastic element is arranged between the bearing housing with the two fixedly accommodated bearings and the bearing-block support and/or between the bearing-block support and the machine casing or between the bearing-block support and the bedplate.

According to a particular embodiment of the two devices, that is to say the bearing arrangement and the bearing block, for elastic suspension provision can be made for an elastic element made of an elastic material, such as rubber, a plastic elastomer, or a rubber-metal composite. Damping elements made of a rubber-metal composite, for example under the trade name MEGI®, are known. In addition to reversible spring characteristics, the elastic element can also have damping characteristics. Damping itself is loss-affected in this case, that is to say some of the mechanical vibrational energy which acts upon the elastic element is converted into thermal energy in the process.

According to one embodiment of the devices, the elastic element has spring characteristics and damping characteristics rated in such a way that when magnetic support is lost the rotor shaft deflects by a deflection travel. The deflection travel in this case is in relation to the constructional rotational axis of the rotating machine. The deflection travel has a maximum value which lies between an operational nominal value of the touchdown-bearing air gap and a multiple thereof, especially a multiple of between 10 and 20. As a result of the significantly greater deflection travel in comparison to the prior art, an especially gentle cushioning of the rotor shaft which drops into the touchdown bearing is possible. As a result of the fixed connection between magnetic radial bearing and touchdown bearing, at no point in time is the magnetic bearing, especially the coils of the magnetic bearing, contacted and damaged by the outer side of the rotor shaft.

According to a further embodiment, the magnetic radial bearing and the touchdown bearing are designed for contactless support of the rotor shaft and for catching said rotor shaft up to a shaft load of 1 t. In a particular embodiment, the shaft load can even assume higher values, such as 5 t, 10 t or more.

Finally, for axial fixing of the rotor shaft the device may have a magnetic thrust bearing which is fixedly connected to the two bearings and arranged axially thereto. Such a thrust bearing interacts with a radially projecting disc which is fixedly connected to the rotor shaft and contactless in relation to the thrust bearing.

BRIEF DESCRIPTION OF THE DRAWING

The invention and also advantageous embodiments of the invention are subsequently exemplarily explained based on the figures. In this case, in the drawing FIG. 2 shows a vertical section through the rotational axis of the bearing block shown in FIG. 1, with an elastic element introduced between a bearing housing and machine support of the bearing block, FIG. 3 shows the bearing block according to FIG. 2 in the case of failure of the magnetic radial bearing.

DETAILED DESCRIPTION OF PREFERRED EMBODIMENTS

Figure 1:
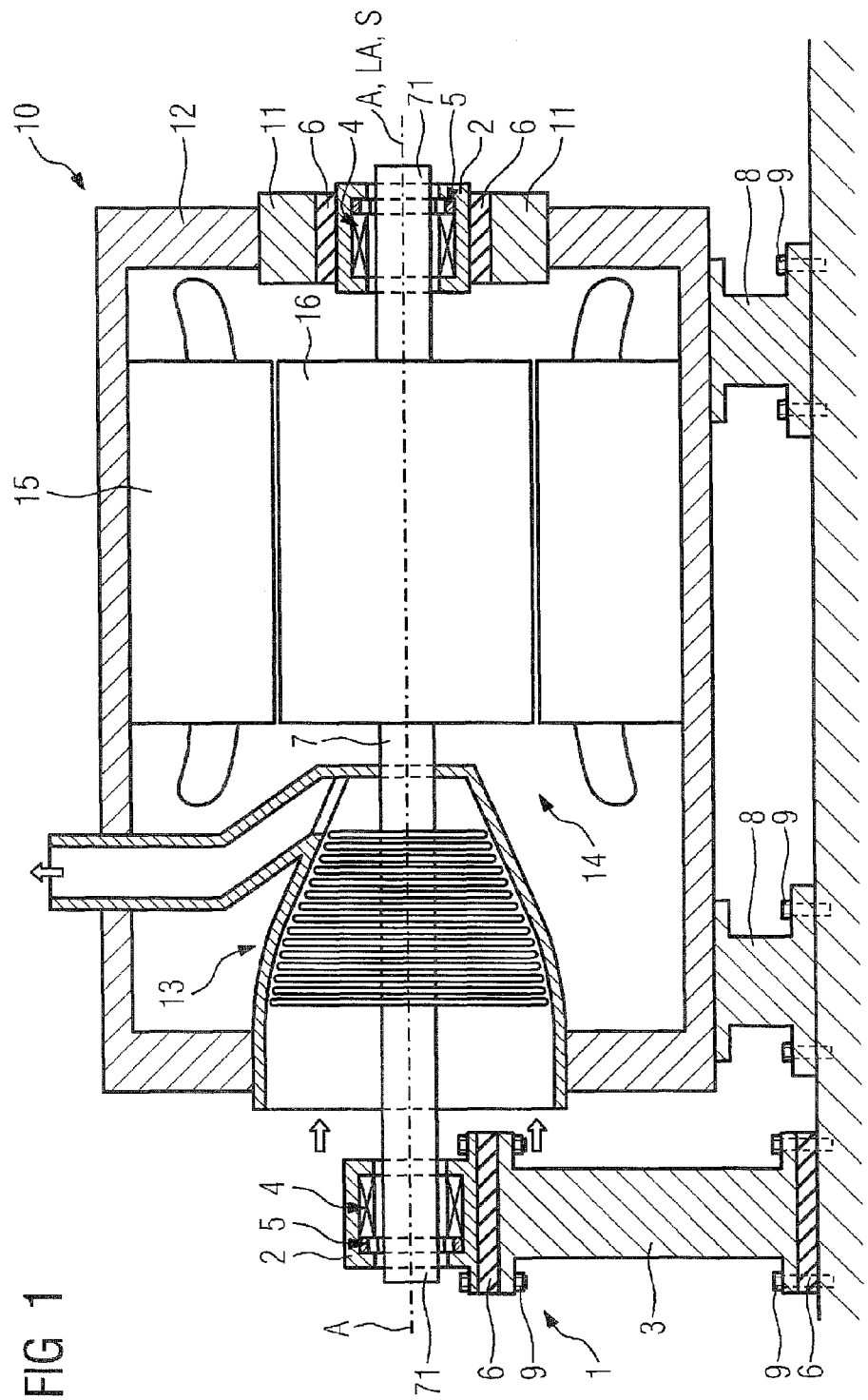
FIG. 1 shows a rotating machine with a rotor end, which by way of example is supported in a bearing block, and a bearing arrangement accommodated in a bearing bracket of the rotating machine.

FIG. 1 shows a rotating machine 10 with a rotor-shaft end 71 which for example is supported in a bearing block 1, and a bearing arrangement which is accommodated in a bearing bracket 11 of the rotating machine 10. In the case of the rotating machine 10 which is shown in FIG. 1, it is a turbocompressor, for example, which features a turbine unit 13 and an electric motor unit 14 for driving a common rotor shaft 7. Seated upon the rotor shaft 7, for one thing, are a turbine, which is not additionally designated, and a rotor packet 16 of the electric motor unit 14 for driving the turbine. A stator of the electric motor unit 14 is identified by the designation 15. A machine casing of the rotating machine 10 is identified by the designation 12. The entire machine casing 12 is fastened on two machine supports 8 on a bedplate 20. Corresponding fastening means, especially fastening bolts, are identified by the designation 9.

In the left-hand part of FIG. 1, the left-hand end 71 of the rotor shaft 7 is accommodated in a bearing block 1 for support. A bearing-block support is identified by the designation 3. The bearing block 1 which is shown has a bearing housing 2 in which are arranged a magnetic radial bearing 4 for contactless support of the rotor shaft 7 and a touchdown bearing 5 for catching said rotor shaft 7. By contrast, the right-hand end 71 of the rotor shaft 7 is accommodated for example in a bearing arrangement which in its turn is arranged in a bearing bracket 11 of the rotating machine 10. The bearing bracket 11 in its turn can be fixedly connected to the machine casing 12 of the rotating machine 10. A rotational axis of the rotor shaft 7, a (constructional) support axis of the bearing arrangement or of the bearing block 1, and also a (constructional) rotational axis of the rotating machine 10, are identified by the designations A, LA and S. All three axes A, LA, S are practically in alignment with each other during normal operation of the rotating machine 10.

According to the invention, the magnetic radial bearing 4 and the touchdown bearing 5 are now in axial alignment and fixedly interconnected. Furthermore, the bearings 4, 5 are elastically suspended with regard to the bearing bracket 11, to the machine casing 12 or to the bedplate 20 of the rotating machine 10.

In the example of FIG. 1, an elastic element 6 for the elastic suspension is arranged between the bearing housing 2 and the bearing-block support 3 in the bearing block 1 which is shown. Alternatively or additionally, the elastic element 6, as shown with hatching in the example of FIG. 1, can also be arranged between the bedplate 20 and the bearing-block support 3. In the case of the material which is shown it is especially a plastic elastomer or a rubber material. This can alternatively or additionally have mechanical spring elements such as disk springs or the like. The bearing-block support 3 is screwed to the bearing housing 2 of the bearing block 1 for example by means of fastening bolts 9. Alternatively, the bearing block 1 can have a common bearing housing which is assembled in one piece from the bearing housing 2 and the bearing-block support 3. This part can be produced for example from a casting. In the right-hand part of FIG. 3, the bearing arrangement which is shown is similarly fixedly accommodated in a bearing housing 2. The bearing housing 2 is connected via a, for example, annular, elastic element 6 to the bearing bracket 11 which is shown, which bearing bracket in its turn can be fixedly connected to the casing 12 of the rotating machine 10. The bearing bracket 11 is customarily screwed to the end face of the machine casing 12 in the manner of a flange.

FIG. 2 shows a vertical section of the bearing block 1 according to FIG. 1 through the rotational axis A of the rotor shaft 7 during normal operation of the rotating machine 10. The rotor shaft 7 which is shown is consequently suspended in a contactless manner in the magnetic radial bearing 4. In this case, the rotational axis A of the rotor shaft 7, the constructional bearing axis LA and also the constructional rotational or machine axis S of the rotating machine 10 practically coincide. A coil body of the magnetic bearing 4 is identified by the designation 41, and the annular core of the magnetic bearing 4 is identified by the designation 42. An outer race of the touchdown bearing 5, which like the core 42 of the magnetic bearing 4 is fixedly accommodated in the bearing housing 2, is identified by the designation 51. Friction elements on the inner side of the bearing outer race 51, which when supply of the magnetic radial bearing 4 is lost contact and support the radial outer side of the rotor shaft 7, are identified by the designation 52.

A magnetic air gap, which is set during operation of the rotating machine 10 or of the magnetic radial bearing 4, is identified by the designation LM. An operational air gap between the outer side of the rotor shaft and the touchdown bearing 5 is identified by the designation LF. The operational air gap is typically considerably smaller than the magnetic air gap LM. The magnetic air gap LM typically has values within the range of 0.5 to 1.0 mm. In contrast, the touchdown-bearing air gap LF typically has a value within the range of 0.1 to 0.5 mm.

In the bearing block 1 which is shown, the bearing housing 2 is connected via an elastic element 6 to the machine support 3 which in its turn is fixedly connected to the bedplate 20 which is not additionally shown. Two machine-fixed reference planes are drawn in with the designations B1, B2 and are in relation to the machine casing 12 or to the bedplate 20 of the rotating machine 10.

FIG. 3 shows the bearing block 1 according to FIG. 2 in the case of failure of the magnetic bearing 4. As a result of the now-absent magnetic force, the rotor shaft 7 drops into the touchdown bearing 5. Owing to the fact that the touchdown bearing 5 and the magnetic radial bearing 4 are fixedly interconnected—as here in the present example by means of the common bearing housing 2—the rotor shaft 7 cannot contact and consequently cannot damage the magnetic radial bearing 4. As a result of the elastic suspension of the bearing housing 2 via the elastic element 6 with the fixed bearing-block support 3, the rotor shaft 7 can elastically deflect. As a result, the shock loading and possible damage of the touchdown bearing 5 are avoided. As a result of the rotor shaft 7 dropping into the touchdown bearing 5, the previously commonly aligning axes A, S, LA now no longer coincide because of the elastic deflection. As FIG. 3 shows, the bearing housing 2, in comparison to FIG. 2, is displaced downwards as a result of the compression of the elastic element 6. This distance corresponds to the deflection travel EW by which the bearing arrangement can elastically yield in comparison to the prior art. In this case, the elastic element 6 has spring characteristics and damping characteristics rated in such a way that the rotor shaft 7 can deflect by this deflection travel EW when magnetic support is lost. The deflection travel has a maximum value which lies between an operational nominal value of the touchdown-bearing air gap LF and a multiple thereof. The multiple may lie within a range of 10 times to 20 times.

Figure 4:
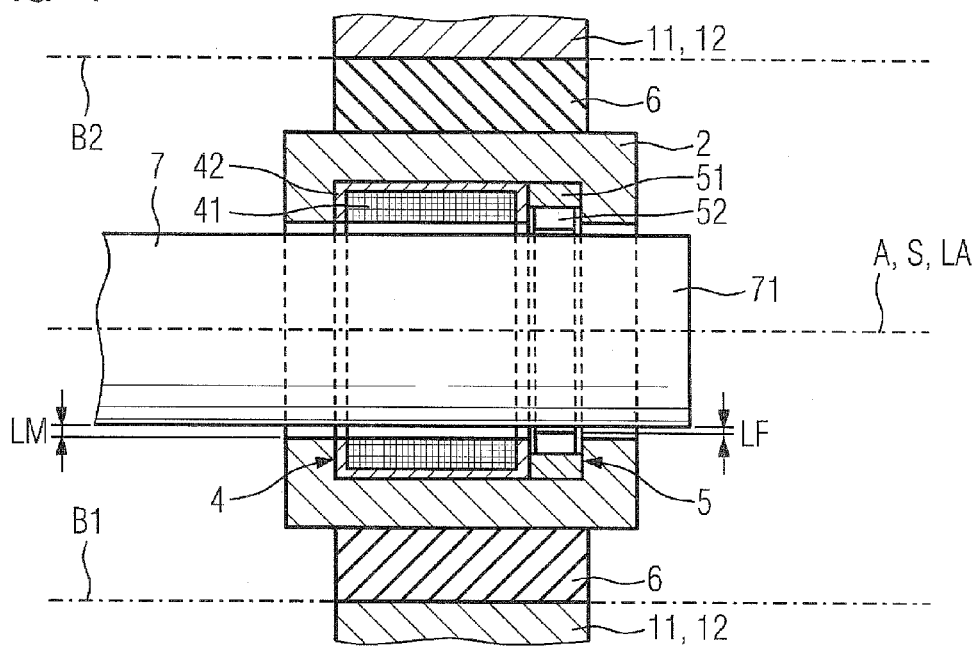
FIG. 4 shows a vertical section through the rotational axis of the bearing arrangement according to FIG. 1.

FIG. 4 shows the bearing arrangement in the right-hand part of FIG. 1 in enlarged view and in section through the rotational axis A of the rotating machine 10.

In comparison to the previous solution according to FIG. 2 and FIG. 3, the bearing arrangement according to the invention is now connected via for example two elastic elements 6 to the bearing bracket 11 of the rotating machine 10. Instead of the two elastic elements 6 which act in the vertical direction, the bearing arrangement can have one annular elastic element 6 which is arranged radially to the rotational axis A. Alternatively, the bearing arrangement can be fixedly accommodated in a bearing housing 2, wherein this is then enclosed by the two vertically acting elastic elements 6 or by the annular elastic element 6. Furthermore, the bearing arrangement can be elastically accommodated in the bearing housing 2 and this can be connected fixedly, that is to say inflexibly or rigidly, to the bearing bracket 11 or to the machine casing 12 of the rotating machine 10.

Figure 5:
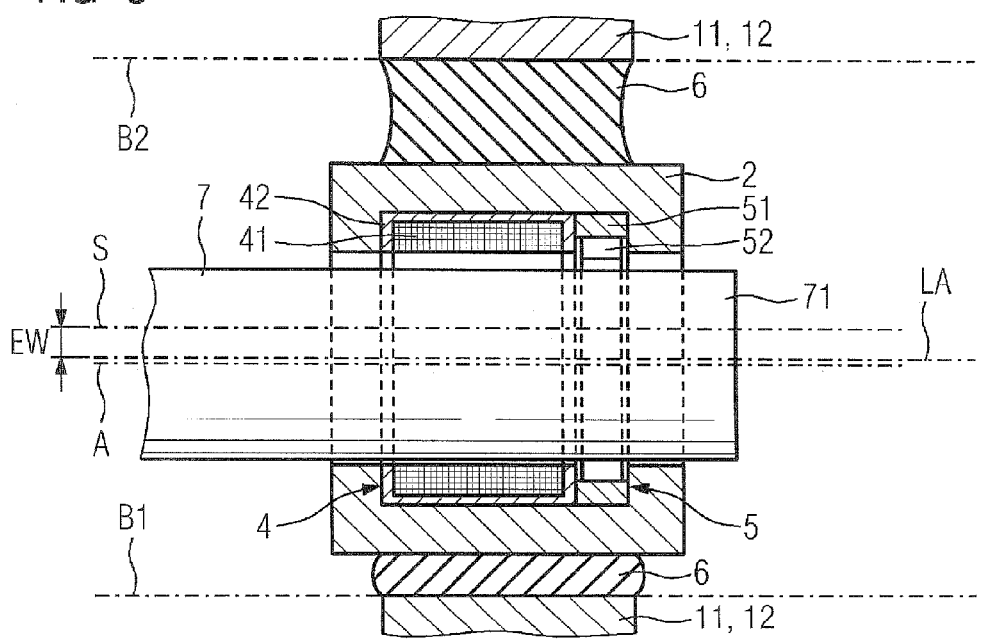
FIG. 5 shows the bearing arrangement according to FIG. 4 in the case of failure of the magnetic radial bearing.

FIG. 5 shows the bearing arrangement according to FIG. 4 in the case of failure of the magnetic support. The end 71 of the rotor shaft 7 which is shown has again dropped into the touchdown bearing 5 and in the process presses the bearing housing 2 of the bearing arrangement according to the invention downwards. As a result, the lower elastic element 6 or the lower part of the annular elastic element 6 is compressed and at the same time the upper elastic element 6 or the upper part of the annular, common, elastic element 6 is stretched. Deflection travel for cushioning of the rotor shaft 7, which is advantageously additionally available in comparison to the prior art, is again identified by the designation EW.

The magnetic radial bearing 4 and the touchdown bearing 5 of the bearing arrangement according to the invention or of the bearing block 1 according to the invention are preferably designed for contactless support of the rotor shaft 7 and for catching said rotor shaft up to a shaft load of 1 t. In the case of particularly heavy rotating machines, the shaft load can even reach 5 t, 10 t or more.

Finally, the bearing block 1 according to the invention and the bearing arrangement according to the invention can also have a magnetic thrust bearing, which is not additionally shown, for axial fixing of the rotor shaft 7 of the rotating machine 10.

The invention claimed is:

1. A bearing arrangement for a rotor shaft of a turbomachine having an electric power output of at least 1000 kW, said bearing arrangement comprising:
   a bearing housing;
   a magnetic radial bearing for contactless support of the rotor shaft; and
   a touchdown bearing for catching the rotor shaft,
   wherein the radial and touchdown bearings are fixedly interconnected and accommodated in axial alignment in the bearing housing, and
   wherein the bearing housing is elastically suspended with regard to a bearing bracket or a machine casing.

2. The bearing arrangement of claim 1, wherein the magnetic radial bearing and the touchdown bearing are designed for a shaft load of up to 10 t.

3. A bearing arrangement for a rotor shaft of a turbomachine having a power output of at least 1000 kW, said bearing arrangement comprising:
   a housing;
   a magnetic radial bearing for contactless support of the rotor shaft; and
   a touchdown bearing for catching the rotor shaft,
   wherein the radial and touchdown bearings are accommodated in axial alignment in the bearing housing and elastically suspended in the bearing housing, and
   wherein the bearing housing is fixedly connected to a bearing bracket or to a machine casing.

4. The bearing arrangement of claim 3, wherein the magnetic radial bearing and the touchdown bearing are designed for a shaft load of up to 10 t.

5. A bearing block arranged axially on the outside of a turbomachine having a power output of at least 1000 kW, said bearing block comprising:
   a bearing housing;
   a magnetic radial bearing for contactless support of a rotor shaft of the turbomachine;
   a touchdown bearing for catching the rotor shaft of the turbomachine, and
   a support for fastening the bearing housing on a machine casing or on a bedplate of the turbomachine
   wherein the radial and touchdown bearings are fixedly interconnected and accommodated in axial alignment in the bearing housing, and
   wherein the radial and touchdown bearings are elastically accommodated in the bearing housing.

6. The bearing block of claim 5, wherein the magnetic radial bearing and the touchdown bearing are designed for a shaft load of up to 10 t.

7. A bearing block arranged axially on the outside of a turbomachine having a power output of at least 1000 kW, said bearing block comprising:

a bearing housing;

a magnetic radial bearing for contactless support of a rotor shaft of the turbomachine;

a touchdown bearing for catching the rotor shaft of the turbomachine;

a support for fastening the bearing housing on a machine casing or on a bedplate of the turbomachine; and at least one elastic element arranged at a location selected from the group consisting of between the bearing housing and the support, between the support and the machine casing, between the support and the bedplate, and combinations thereof, wherein the radial and touchdown bearings are accommodated in axial alignment and fixed in the bearing housing.

8. The bearing block of claim 7, wherein the elastic element is made from an elastic material.

9. The bearing block of claim 8, wherein the elastic material is selected from the group consisting of rubber, plastic elastomer, and rubber-metal composite.

10. The bearing block of claim 7, wherein the elastic element has spring and damping characteristics sufficient to enable the rotor shaft to deflect by a deflection travel in the case of failure of a magnetic support of the rotor shaft, wherein the deflection travel is related to a rotational axis of the rotor shaft and has a maximum value between an operational nominal value of a magnetic-bearing air gap and a multiple thereof.

11. The bearing block of claim 10, wherein the deflection travel is a multiple of 10 to 20 times the operational nominal value of the magnetic-bearing air gap.

12. The bearing arrangement of claim 7, wherein the magnetic radial bearing and the touchdown bearing are designed for a shaft load of up to 10 t.

* * * * *